United States Patent [19]
Morghen

[11] Patent Number: 4,964,218
[45] Date of Patent: Oct. 23, 1990

[54] OPTICAL OR LASER BALL TARGET ASSEMBLIES FOR PRECISION LOCATION MEASUREMENTS

[75] Inventor: Manfred Morghen, San Diego, Calif.

[73] Assignee: General Dynamics Corporation, Convair Division, San Diego, Calif.

[21] Appl. No.: 377,642

[22] Filed: Jul. 10, 1989

[51] Int. Cl.$^5$ .............................................. G01C 15/06
[52] U.S. Cl. ........................................ 33/293; 33/299
[58] Field of Search .................. 33/293, DIG. 1, 502, 33/286, 644, 645, 567, 286

[56] References Cited

U.S. PATENT DOCUMENTS

| | | | |
|---|---|---|---|
| 2,831,260 | 4/1958 | Shaw | 33/559 |
| 3,188,739 | 6/1965 | Olsen et al. | 33/293 X |
| 4,521,968 | 6/1985 | Wiltermood et al. | 33/DIG. 2 X |
| 4,543,729 | 10/1985 | Holbrook | 33/293 |

Primary Examiner—Harry N. Haroian
Attorney, Agent, or Firm—John R. Duncan; Frank D. Gilliam

[57] ABSTRACT

The invention is directed to targets for use where precise alignment and location measurements on an object is required. Several embodiments of the invention are described. The targets have at least a portion of their outer surface curvilinear. The target is supported on a convex supporting surface on a support body. Various configured single targets and multiple targets are described for use on flat as well as curved surfaces. Some of the targets have either non-reflective or reflective target surfaces. The various embodiments of the ball targets are used in conjunction with either optical or laser theodolites or the like to preform the required location measurements.

22 Claims, 3 Drawing Sheets

OPTICAL OR LASER BALL TARGET ASSEMBLIES FOR PRECISION LOCATION MEASUREMENTS

BACKGROUND OF THE INVENTION

The invention is directed to measuring devices for defining a precise location on an object and more particularly to ball targets used to accomplish such precise measurements when used in combination with optic or laser theodolities.

An important activity in industrial manufacturing processes is that of taking the precise measurements of patterns, machine components, jigs, work pieces and the like. Also, in certain cases, individual components are manufactured at different locations and are first fitted together in a final assembly shop. Good accuracy in fitting these components together makes it possible to avoid reworking and modifications. The various ball targets of the instant invention can be used to improve the accuracy of these required measurements.

Present state of the art targets for preforming these measurements can be found in the following U.S. Pat. Nos.: 4,509,269 by Heimut Leitz; 4,527,339 by Amber N. Brunson; 4,549,360 by Frank L. Allen and 4,644,661 by Giovanni Bozzolato.

U.S. Pat. No. 4,509,269 uses a rod-shaped holder with a pair of sight balls located at different elevations therealong. The holder is threadedly attached to the object to be measured.

The remainder of the above cited patents do not use ball configured targets.

Improved ball configured targets that are easy to precisely attach to and remove from an object, inexpensive to manufacture and can be used at any location on the object will find wide acceptance in the manufacturing, assembly and inspection arts.

SUMMARY OF THE INVENTION

This invention is directed to a plurality of different embodiments of ball targets for use in measuring, locating and inspection specific locations on various configured objects. In one embodiment, a precisely machined plastic target ball is mounted in the center of a cavity having the same precise radius of the ball. The cavity is located on the distal end surface of a support body that is constructed of meehanite casting or tool steel. The support body is held in position on a nesting saddle by a central magnet, suction cup or the like, the nesting saddle is inserted into a precisely dimensioned aperture in the object and is held there by a plurality of spaced apart magnets or suction cups located in a nesting saddle which rests on the surface of the object adjacent to the edge of the aperture.

Another embodiment of the invention utilizes similar components except that a half sphere ball target is used. The half ball is constructed of hardened steel or meehanite and the flat surface of the half sphere either carries a sight target or has a reflective surface.

Another embodiment of the invention utilizes the same components as above except a mirrored sphere is employed.

Yet another embodiment of the invention comprises a receptacle plate on which is positioned three spaced apart target legs which are radiused on the object contacting surface and have a ball target on the opposite end. The legs are of the same exact length and have the same relative position relative to the receptacle plate.

The receptacle plate has a central aperture for a slip fit of a central ball target which is the same exact length as the three spaced apart target legs. The central aperture is radiused on the object contacting end and has the target ball located on the opposite end. The central ball target rests on the surface of the object when in position for use.

Still another embodiment of the invention for measuring inside corner surfaces comprises a ball target fixedly attached to the central upper surface of a support base. The base support has a magnet or suction cup object attachment means and a rectilinear undercut bottom surface or removable leg supports. Extension rings with magnets or suction cups on one surface nest with the under side of the undercut support base or each other and one or more can be used to establish the required elevation of the ball target carried at the upper central surface of the support base.

Still another embodiment of the invention is used for establishing precise locations on concave surfaces. In this embodiment the bottom of the ball target support is radiused exactly the same as the ball target and the exact geometrical center of the ball target is located in the exact geometrical center of the radiused surface of the support, i.e. the geometrical center of the target support ball radius and the ball target exactly coincide. A magnet or suction cup centrally located on the object attachment side of the support base holds the support fixed relative to the object.

Yet another embodiment of the invention is designed to find the exact center of holes of slightly variable inside diameters in objects. This embodiment employs a support plate with a central cam plate opening. Three fixed in place spaced apart probes extend into the central opening an equal distance for engagement with three lobes of a cam positioned intermediate the ends of a cam shaft. A knurled circular knob located on the outer distal surface of the shaft allows manual rotation of the cam relative to the support plate and probes. A target assembly including a ball target is adapted to attached to the upper surface of the support plat adjacent to the circular knob. The other end of the cam shaft is inserted into the slightly variable opening in the surface of the object.

A slightly modified version of the last mentioned embodiment which uses four probes instead of three is used to locate the base of the ball target in the center of an elongated slot or an oval shape (elliptical) aperture.

In some embodiments the target ball is constructed of transparent plastic and in others the target ball is constructed of metal and has a reflective or mirrored surface and is either round, half round, thirds round or three fourths round with a concave (parabolic) surface.

The principal object of this invention is to provide a precision optical/laser target for use with optical or laser measurement systems for precise location on an object.

Another object of this invention is to provide a positioning means for supporting the target which is rotatable about at least one axis passing through the target while retaining the previous geometric relationship between the target and the surface of the structure to which the target is affixed.

Still another object of the invention is to provide a target which is positionable in the center of an uneven or non-circular diameter aperture or an elongated slot or an oval shape aperture.

A further object of this invention is to provide a target which can be selectively elevated relative to the surface of the object to which it is attached for measurement.

Other objects and advantages of this invention will become apparent from the following description taken in conjunction with the accompanying drawing Figures wherein are set forth, by way of illustration and example, certain embodiments of this invention.

BRIEF DESCRIPTION OF THE DRAWING FIGURES

Figure 4:
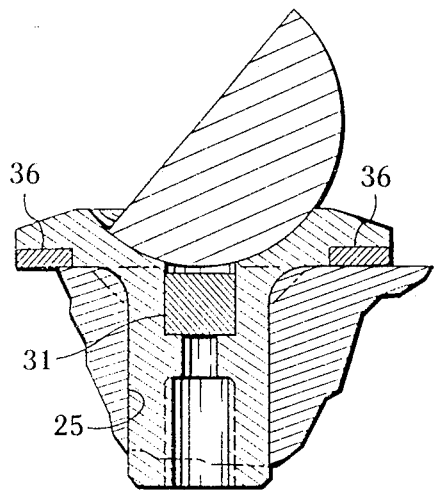
FIG. 4 is a second embodiment of the first embodiment of the invention.
Figure 5:
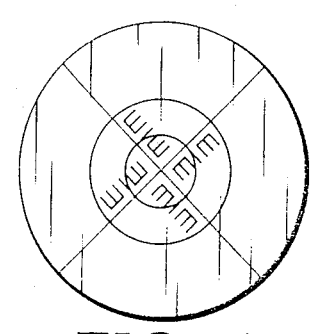
Figure 6:
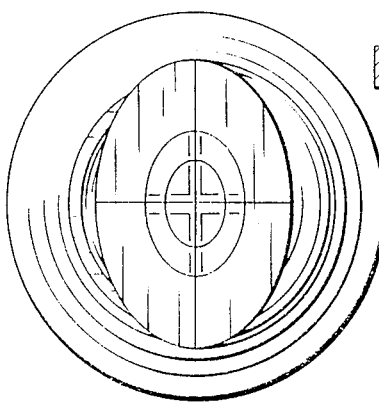
Figure 7:
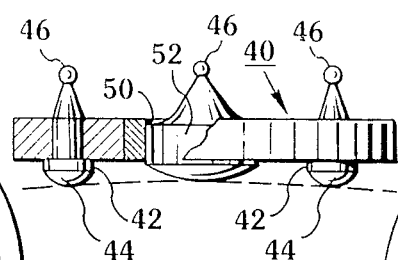
Figure 8:
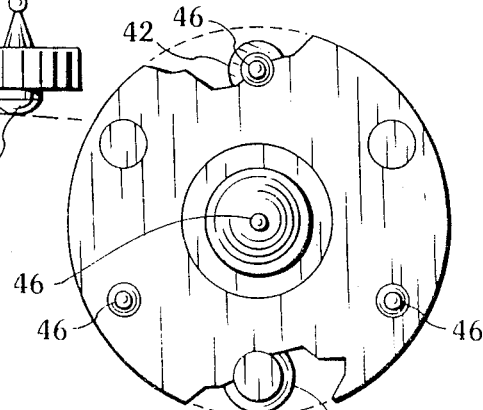
Figure 9:
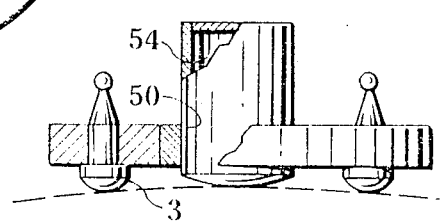
Figure 10:
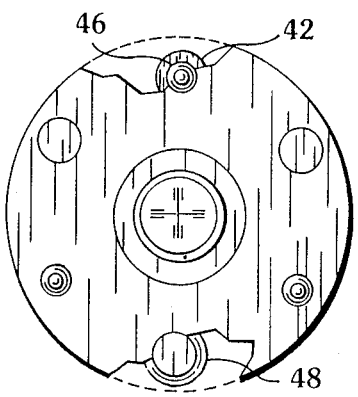
Figure 11:
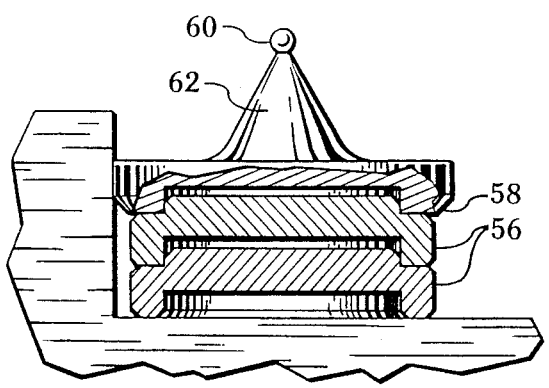
Figure 12:
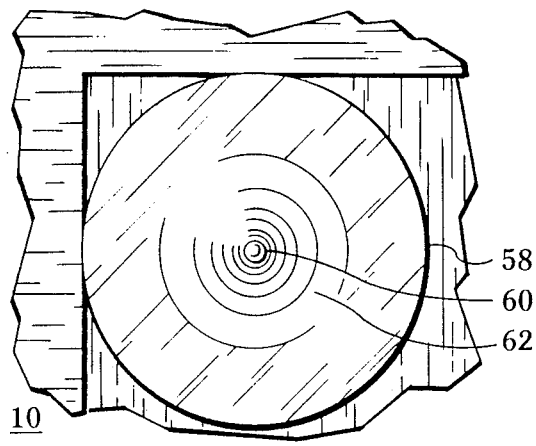
Figure 13:
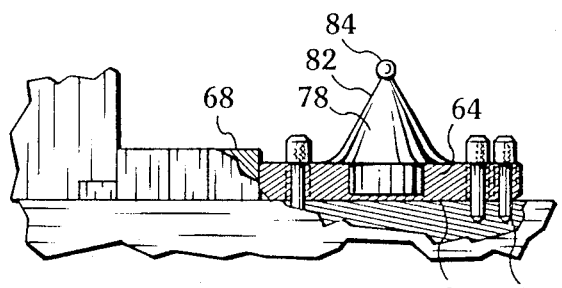
Figure 14:
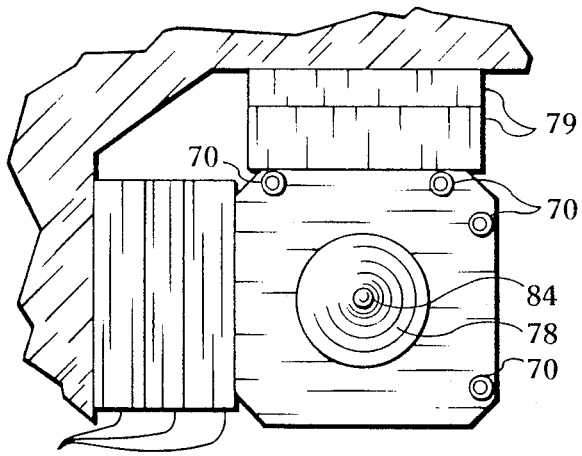
Figure 15:
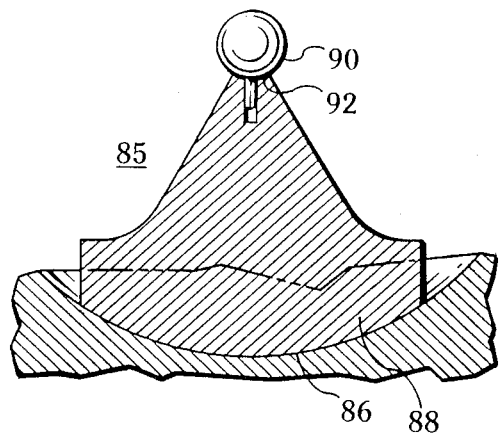
Figure 16:
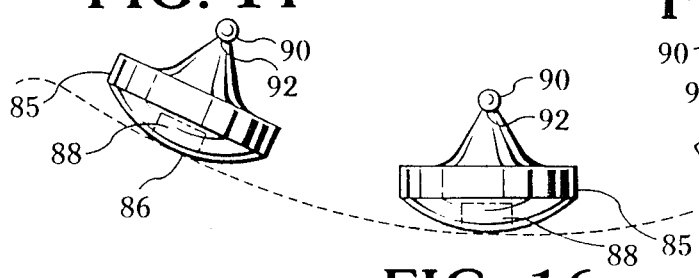
Figure 17:
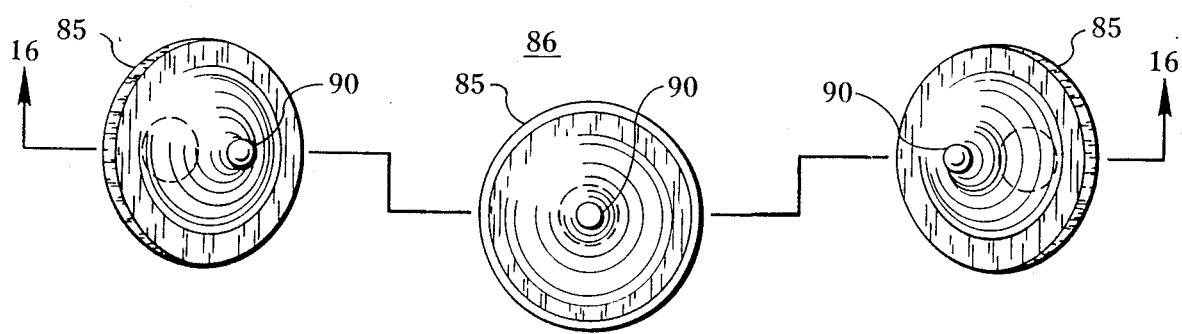
Figure 18:
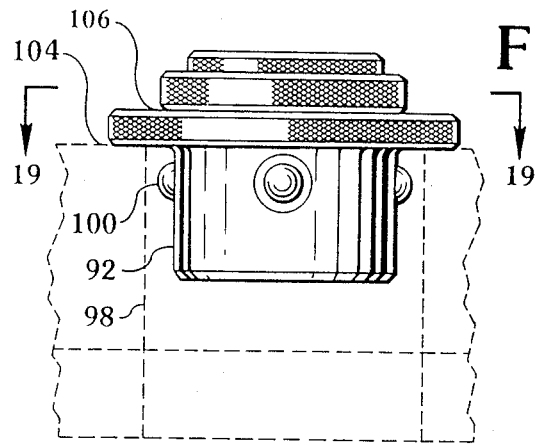
Figure 19:
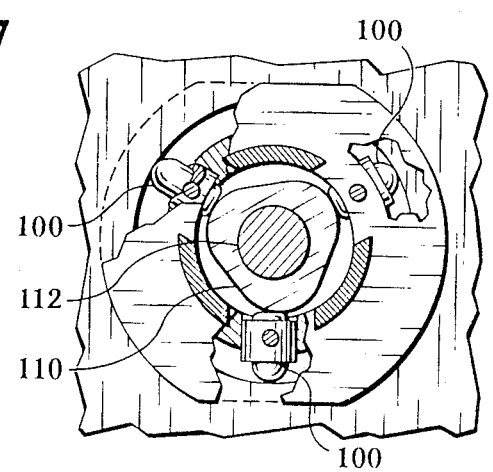
Figure 20:
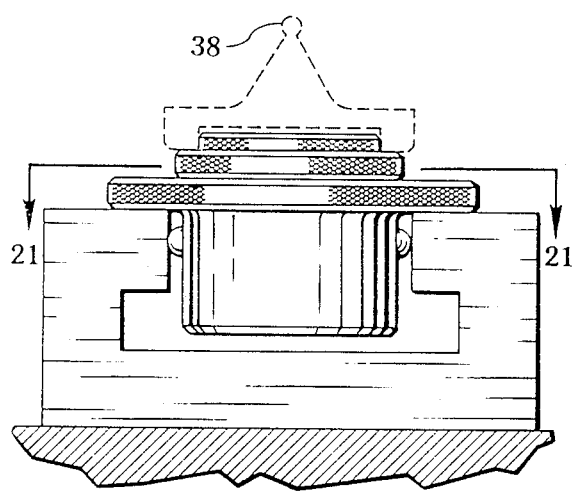
Figure 21:
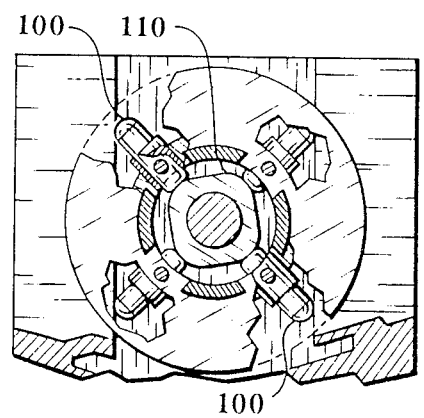
Figure 22:
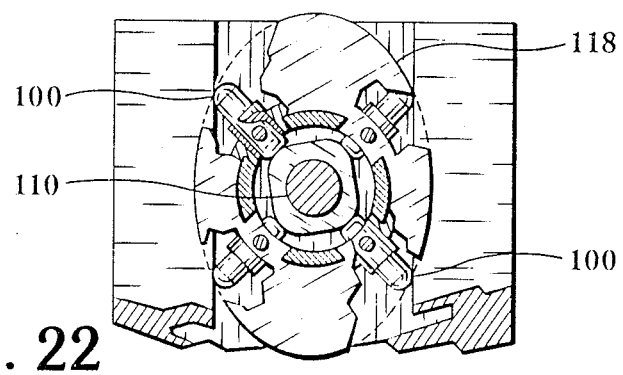

FIG. 4 A is a third embodiment of the first embodiment of the invention;

FIG. 5 is showing of the flat surface of the ball target of a first embodiment of the FIG. 4 showing;

FIG. 6 is a showing of the flat surface of the ball target of a second embodiment of the FIG. 4 showing;

FIG. 7 is a first embodiment of the ball target locator assembly;

FIG. 8 is a plan view of the showing of FIG. 7;

FIG. 9 is a second embodiment of the FIG. 7 showing;

FIG. 10 is a top plan view of the showing of FIG. 9;

FIG. 11 is a cutaway side showing of a third embodiment of the invention;

FIG. 12 is a top plan view of FIG. 11;

FIG. 13 is a cutaway side view showing a second embodiment of the third embodiment of the invention;

FIG. 14 is a plan view of the showing of FIG. 13;

FIG. 15 is a cutaway side view showing of a fourth embodiment of the invention;

FIG. 16 is a cutaway side showing of a contour surface with three of the fourth embodiments of FIG. 15 resting on a concave surface;

FIG. 17 is a top plan view of the showing of FIG. 16;

FIG. 18 is a cutaway side view showing of a fifth embodiment of the invention;

FIG. 19 is a top plan view of FIG. 18;

FIG. 20 is a cutaway side view showing similar to the FIG. 18 showing including a ball target positioned thereon;

FIG. 21 is a top plan view of a second embodiment of the fifth embodiment of the invention; and FIG. 22 is a top plan view of a third embodiment of the fifth embodiment of the invention.

DETAILED DESCRIPTION OF THE PREFERRED EMBODIMENTS OF THE INVENTION

Figure 1:
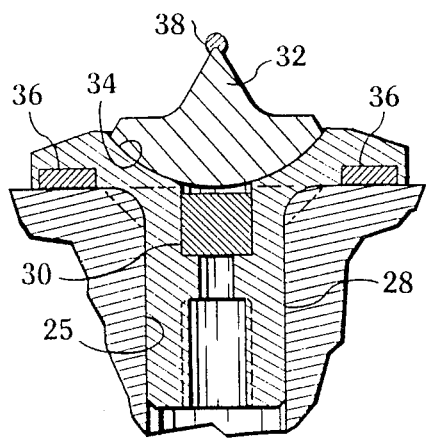
FIG. 1 is a cutaway side view showing of a first embodiment of the invention.

Referring now specifically to drawing FIG. 1, this embodiment of the invention is directed to optical or laser ball targets which can be used for machine tool construction, or construction of large equipment where the location of a certain hole needs to be defined in reference to its X, Y, and Z axis position, i.e. a certain location needs to be precisely located on a work piece. The ball target of the first embodiment of the invention is shown in detail. An aperture 25 is precisely bored or otherwise provided in the surface of a work piece with respect to which a precise location which is desired to be located. The ball target assembly includes a close slip fit base 28. Although generally it is desired to merely provide the a close slip fit with the aperture, threads on the distal end of the base and mating threads in the bore could be utilized to attach the base 28 to the bore. The central portion of the support base adjacent to the reference point "A" includes a magnet 30 implanted therein to hold the target unit 32 into a nesting relationship with a base support saddle 34. The outer periphery of the base member which overlays the surface 26 and includes base holding means 36 in the form of magnets when the surface is ferrous or vacuum cups or the like when the surface is non-ferrous.

Figure 2:
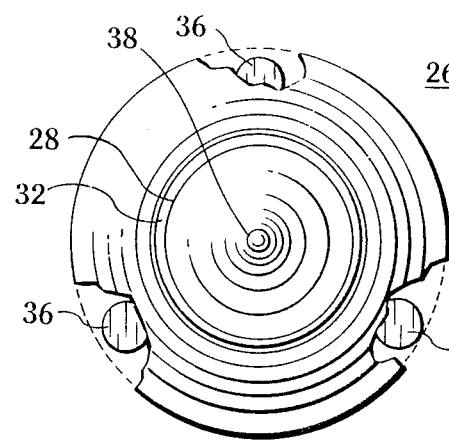
FIG. 2 is a top view of the embodiment of FIG. 1.
Figure 3A:
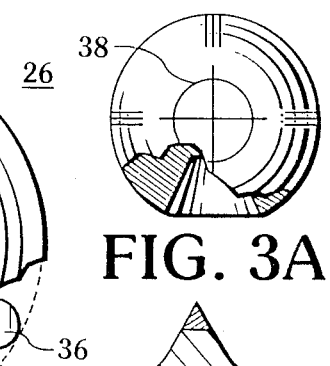
FIG. 3A is a is an enlarged showing taken along line 3—3 of FIG. 2.
Figure 3B:
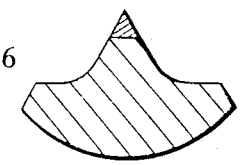
FIG. 3B is a second embodiment of an enlarged showing of FIG. 2.

FIG. 2 is a top plane view showing of FIG. 1, FIG. 3A is an enlarged showing of the ball of the ball target of FIG. 1 and FIG. 3B is a showing of a optical precision cone point target which may be coated with color or the like for better visibility. The ball 38 is shown located on the tip distal end of target unit 32. In the FIG. 3A showing the ball includes surface markings for sighting. In the FIG. 3B showing the ball is eliminated and a sharp point is used in place thereof.

In use the base is slip fitted into the aperture and is held in place thereto by means of the base holding means 36. As can been readily seen, the center of the ball target 38 is always in line with the point "A" and accordingly extremely accurate point location can be obtained through repeat measurement shots between arbitrary rotational movements of the target ball 38 in the ball assembly 32 nesting saddle 34.

Figure 4A:
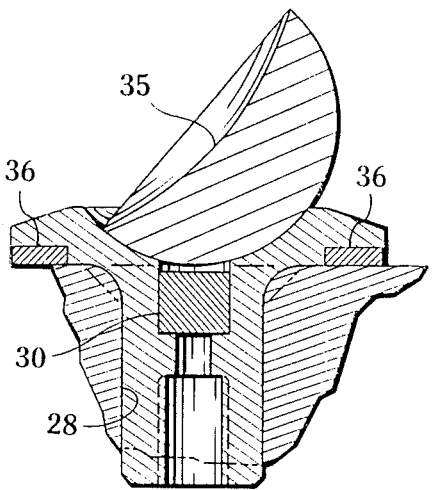

In the embodiment of FIGS. 4 and 4A, the same base structure is utilized as above described. The target of the FIG. 4 showing is a half round ball and, as shown in drawing FIGS. 5, the half round ball target can have a optical mirrored surface with graduations thereon or can have a matte black finish with a target thereon as shown in drawing FIG. 6. Likewise a two thirds or three quarters ball with a concave or parabolic surface with a center point 35 either marking or reflective identified as shown in FIG. 4A.

The embodiment of the FIGS. 7 and 9 is used for locating and measuring a point "A" either on a contour surface or on an absolute flat surface. This embodiment includes a base member 40. The base member 40 included three support legs 42. The bottom surface 44 of the support legs 42 are curvilinear and the upper surfaces are formed to support a ball target 46. Also carried by the base member and spaced between the legs 42 are three attachment feet 48 similar to legs 42 with no upper ball target 46. The attachment feet like those previously described can be either magnets when the base is positioned on ferris material surface or suction cups for other type material. The base includes a central opening or aperture 50 for receiving a slip fit target assembly 52. In the FIG. 7 showing the target is in the form of an insert similar to the legs 42 and attachment feet 48 except rather than being threaded into the base as are legs 42 and feet 48 a slip fit is provided in a central aperture 48 in the base 40 and when in place the bottom curvilinear end rests on point "A" the area with the ball is elevated for sighting. The base of the ball target of FIG. 9 is the same as aforementioned and a hollow cylinder 54 replaces the target of FIG. 8. The plan view of the targets of both FIGS. 7 and 9 are shown in FIGS. 8 and 10 respectively. In use the FIG. 7 device is sighted approximately from the sides while the FIG. 9 device is sighted from the top as shown in FIG. 10, (cross hair line up), converting distorted flat points into precisely visible 3D points.

Another embodiment of a base for a ball target is shown in FIGS. 11 and 12 which depict an optical or laser ball target assembly which can be utilized for machine tooling, construction or inspection of large production parts where difficult to reach corners are needed to be measured in directions X, Y and Z. The base of this embodiment a comprises a plurality of nestable magnetic rings 56 which are used to elevate the base member 58 to a required elevation level. Obviously one or more magnetic rings 56 can be stacked beneath the base member 58 to raise a base to the correct or desired elevation. The base member has a ball sight 60 located in the center of the upper surface thereof elevated by means of a truncated pedestal 62. FIG. 12 is a plan view of the device of FIG. 11. Suction cups can be used instead of the magnets when appropriate.

Another embodiment of the FIG. 11 and 12 embodiment which is used for external surface measurement is shown in side cutaway in FIG. 13 and plan in FIG. 14. In this embodiment a base plate 64 has a ground and polished bottom surface 66 which rests on the surface of an object on which a precise location is to be established. The base plate 64 has a plurality of locating apertures 68 through which pins 70 slip fit into and its protruding ends locate against two outside edges XX and YY of the object on which the base plate rests. The base plate is recessed at 74 on the bottom surface 66 adjacent to the center thereof. An aperture 76 is located at the center of the base plate for receiving a target mount 78. A magnet 80 located on the bottom of the target mount 78 holds the target mount in place. The target mount has a concave upper surface 82 for receiving a ball target 84. Precision standard gage blocks (Johnson blocks) 79 are positioned against inside edges AA and BB to avoid a corner as shown in FIG. 14

A side and plan view respectfully of yet another embodiment of a ball target base 85 are shown in FIGS. 15 and 16. In this embodiment "ball target wobbles" are shown. These ball targets can be used for either measurements by photogrammitry or measurements by real time theodolite/optics when a concave type contour, such as a large bulkhead of an airplane or a large form die, needs to be defined and measured by the above referenced methods. Three of the ball target bases are shown located on a contoured object 86 on which the exact contour is to be established. The ball target base has a convex rocker bottom surface 88 with an aperture centered on the bottom for receiving a magnet, suction cup or the like for removably attaching the ball target base to the contour surface of the object 86. A ball target 90 is positioned in the contour formed on the upper tip 92 of the ball target base 85. By use of these ball targets contour measurements through randomly or strategically positioned ball targets can be accomplished.

The ball target embodiments shown in FIGS. 18 and 19 can be used to find the exact center of holes with slightly variable inside diameters. FIG. 18 is a cutaway side view showing of a hole locator ball target assembly 94. FIG. 19 depicts a top view of the FIG. 18 showing taken alone line 19—19. Referring now specifically to those two Figures. The hole locator ball target assembly 94 includes a base member 96 for insertion into an aperture 98 in a work piece. The base member can be short or long depending on the depth of the aperture.

For shallow apertures only one set of three indexing probes 100 are utilized while in deeper apertures two sets of three indexing probes are utilized. Set screws 102 or equivalent locking means are provided to keep the indexing probes from sliding out and if so desired to lock the probes in place in addition to cam lock action. The upper surface of the base member 96 includes a circular protrusion which extends beyond the walls of the aperture 98 and is parallel with the upper surface 104 of the work piece. A cam and knob assembly 106 is inserted into the opening 108 of the base member 96. A three lobed cam 110 is fixedly attached to a central shaft 112 with a hand operated knob 114 located on the upper end of the shaft. In the instance when two sets of three indexing probes 100 are employed a second three lobed cam 110 is positioned below the other cam 110. The three lobed cam or cams are positioned on the same plane as the probes for engagement therewith. In use the base assembly 94 is inserted in to the aperture 98 which is larger in diameter than the base member. The cam and knob assembly is then inserted into 108 of the base member wherein the three lobed cam engages the indexing probes 100. For securing the ball target assembly to the inner surfaces of the aperture the knob 114 is rotated wherein the lobes of the cam assembly force the indexing probes an equal distance against the inner walls of the aperture which centers the base assembly in the aperture. The indexing probes are equally contacting against the inner aperture surface thus centering the base. The steps are reversed for removing the ball targets from the apertures. The indexing probes 100 are removable from the base members and as a set can have various lengths for various different diameter apertures. FIG. 20 depicts the ball target assembly of the FIGS. 18 and 19 with a ball target assembly 62 shown in FIG. 12 positioned thereon.

FIG. 21 depicts a second embodiment of the ball target assembly of FIGS. 18 and 19. The ball target assembly of the FIG. 21 showing is directed for use in locating a ball target in an elongated slot 116. In this embodiment four indexing probes 100 are employed and a four lobed cam is employed to engage and force the indexing probes against the walls of the elongated slot. The operation of the FIG. 21 embodiment is identical to the discussion directed to the operation of the ball target of FIGS. 18 and 19. FIG. 22 depicts the embodiment of FIG. 21 positioned in an oval opening 118.

While described above are the principles of the various embodiment of the ball target of the invention in connection with specific apparatus it is to be clearly understood that this description is made only by way of example and not as a limitation to the scope of the invention as set forth in the summary thereof and in the accompanying claims.

What is claimed is:

1. A target for precision location measurement comprising:
   target means having a curvilinear surface thereon;
   a support means for positioning and holding said curvilinear surface of said target means at a selected location;
   a base means by which said support means is supported adapted to be positioned on a structure surface on which a location is to be measured;
   said support means being rotatable about at least one axis passing through said target means and said structure surface;

whereby the location of points on said structure can be precisely located by measuring the position of said target means.

2. The invention as defined in claim 1 wherein said target means comprises a sphere.

3. The invention as defined in claim 1 wherein said target means is a semi-sphere.

4. The invention as defined in claim 3 wherein said semi-sphere includes a reflective flat target surface.

5. The invention as defined in claim 1 wherein said target means is a partial sphere.

6. The invention as defined in claim 1 wherein said target means is reflective.

7. The invention as defined in claim 1 wherein said target means is non-reflective.

8. The invention as defined in claim 3 wherein said semi-sphere includes a non-reflective flat surface with a target inscribed thereon.

9. The invention as defined in claim 1 wherein said target means comprises a plurality of ball targets.

10. The invention as defined in claim 9 wherein at least three ball targets are used.

11. The invention as defined in claim 1 wherein the elevation of said target means is positionable relative to said base means.

12. The invention as defined in claim 1 wherein said support means includes a concave target means receiving surface whereby said target means can be positioned an infinite number of different angled locations relative to said base means.

13. The invention as defined in claim 1 wherein, said structure surface is curvilinear and the bottom surface of said base means is curvilinear.

14. The invention as defined in claim 1 wherein said target means is sharp point.

15. The invention as defined in claim 1 wherein said base means includes means for centering said base means in an aperture with a slightly variable diameter.

16. The invention as defined in claim 1 wherein said base means include means for centering said base means in an elongated slot.

17. The invention as defined in claim 15 wherein said means for centering comprises a plurality of indexing probes which are equally length adjustable by means of a rotatable cam having lobes equal in number to said indexing probes.

18. The invention as defined in claim 17 wherein said indexing probes number three.

19. The invention as defined in claim 16 wherein said means for centering said base member comprises a plurality of indexing probes which are equally length adjustable by means of a rotatable cam having lobes equal in number to said indexing probes.

20. The invention as defined in claim 19 wherein said indexing probes number four.

21. The invention as defined in claim 19 wherein locking means are provided for selectively locking said indexing probes in their adjusted positions when said base member is centered.

22. The invention as defined in claim 17 wherein locking means are provided for selectively locking said, indexing probes in their adjusted positions when said base member is centered.

* * * * *